United States Patent [19]
Cipolla et al.

[11] Patent Number: 6,115,249
[45] Date of Patent: Sep. 5, 2000

[54] PORTABLE COMPUTER STAND FOR ENHANCED COOLING

[75] Inventors: Thomas Mario Cipolla, Katonah; George Liang-Tai Chiu, Cross River, both of N.Y.

[73] Assignee: International Business Machines Corporation, Armonk, N.Y.

[21] Appl. No.: 08/988,370

[22] Filed: Dec. 10, 1997

[51] Int. Cl.[7] .............................. G06F 1/20; G06F 1/16
[52] U.S. Cl. ..................... 361/687; 248/688; 248/923; 361/683
[58] Field of Search .................. 361/683, 687, 361/681; 248/685, 688, 923; 364/708.1

[56] References Cited

U.S. PATENT DOCUMENTS

| | | | |
|---|---|---|---|
| 4,438,458 | 3/1984 | Munscher | 361/681 |
| 4,571,456 | 2/1986 | Paulsen et al. | 361/687 |
| 4,742,478 | 5/1988 | Nigro, Jr. et al. | 364/708.1 |
| 4,830,328 | 5/1989 | Takach, Jr. et al. | 361/683 |
| 4,951,241 | 8/1990 | Hosoi et al. | 364/708.1 |
| 5,100,098 | 3/1992 | Hawkins | 361/683 |
| 5,111,361 | 5/1992 | Kobayashi | 361/683 |
| 5,503,361 | 4/1996 | Kan-O et al. | 248/688 |
| 5,646,818 | 7/1997 | Hahn | 361/681 |
| 5,737,183 | 4/1998 | Kobayashi et al. | 361/683 |
| 5,760,690 | 6/1998 | French | 340/571 |

*Primary Examiner*—Leo P. Picard
*Assistant Examiner*—Lisa Lea-Edmonds
*Attorney, Agent, or Firm*—Pollock, Vande Sande & Amernick

[57] ABSTRACT

A stand for a portable personal computer including a base including a front side, a back side, a right side, a left side, and a bottom surface. The stand includes at least one stand member interconnectable with the base. The at least one stand member is positionable in a deployed position and a stowed position. In the deployed position the at least one stand member supports at least one portion of the bottom surface of the base at an elevated level with respect to a surface that the portable personal computer is supported by. The at least one stand member engages a surface of the base in the stowed position.

35 Claims, 9 Drawing Sheets

PORTABLE COMPUTER STAND FOR ENHANCED COOLING

FIELD OF THE INVENTION

This present invention relates to a stand for portable personal computers that enhances the cooling capacity of the computers, portable personal computers that include the stand, and methods for thermal management in portable personal computers.

BACKGROUND OF THE INVENTION

Since their conception and design, portable personal computers, as with all computers, have faced the issue of thermal management as a result of heat generated by the processor and other components of the computer. As is well known, excessive heat can degrade performance of computers and result in damage to components of computers. As a result, thermal management is often an important consideration in computer design.

In the last few years, thermal dissipation requirements of portable computers have increased. For example typical portable computers generate heat that must be dissipated in the range of from about 10 watts to about 20 watts and beyond. This is at least in part a result of ever increasing CPU performance. For example, see Yu, THE FUTURE OF MICROPROCESSORS, IEEE Micro, December 1996, pp. 46–53, the entire contents of which are hereby incorporated by reference. Additional heat is also generated by increasing functions performed by portable personal computers, such as digital video disk (DVD), modem, audio, video, among other devices, now often included in portable personal computers. It is expected that future portable personal computers will provide even greater processing performance and functions, thereby continuing the trend of increasing heat dissipation.

For example, with an A4 form factor, i.e., with a 297 mm by 210 mm footprint, the cooling limit for a PC without fan is from about 15 to about 20 watts. Providing more cooling than these limits can not only be a competitive advantage, but also a product differentiation.

SUMMARY OF THE INVENTION

The present invention enhances the performance of a portable personal computer by allowing it to operate in two different states, one where heat dissipation is higher than the other. The higher heat dissipation state is made possible by providing a stand that nests into the base or bottom cover of the computer. When the stand is in a deployed position, it permits greater heat dissipation from the computer by allowing ambient air to circulate under and behind the computer.

Accordingly, aspects of the present invention provide a stand for a portable personal computer including a base including a front side, a back side, a right side, a left side, and a bottom surface. The stand includes at least one stand member interconnectable with the base. The at least one stand member is positionable in a deployed position and a stowed position. In the deployed position, the at least one stand member supports at least one portion of the bottom surface of the base at an elevated level with respect to a surface that the portable personal computer is supported by. The at least one stand member engages a surface of the base in the stowed position.

Aspects of the present invention also provide a portable personal computer including a base including a bottom surface, a back side, a front side, a left side, a right side, and a bottom surface. A display is hingedly interconnected with the base. At least one stand member is interconnectable with the base. The at least one stand member is positionable in a deployed position and a stowed position. In the deployed position, the at least one stand member supports at least one portion of the bottom surface of the base at an elevated level with respect to a surface that the portable personal computer is supported by. The at least one stand member engages a surface of the base in the stowed position.

Additionally, aspects of the present invention provide a method for thermal management in a portable personal computer including a base including a front side, a back side, a right side, a left side, and a bottom surface, and at least one stand member interconnectable with the base. The at least one stand member is positionable in a deployed position and a stowed position. In the deployed position, the at least one stand member supports at least one portion of the bottom surface of the base at an elevated level with respect to a surface that the portable personal computer is supported by. In the stowed position, the at least one stand member engages a surface of the base or is retracted within the computer. The method includes detecting whether the at least one stand member is in the deployed or stowed position or a temperature of the computer. Selected devices in the computer are activated such that the heat output by the activated devices does not exceed the cooling capacity of the computer or a predetermined heat output.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

BRIEF DESCRIPTION OF THE DRAWINGS

The above-mentioned objects and advantages of the present invention will be more clearly understood when considered in conjunction with the accompanying drawings, in which.

Figure 5:
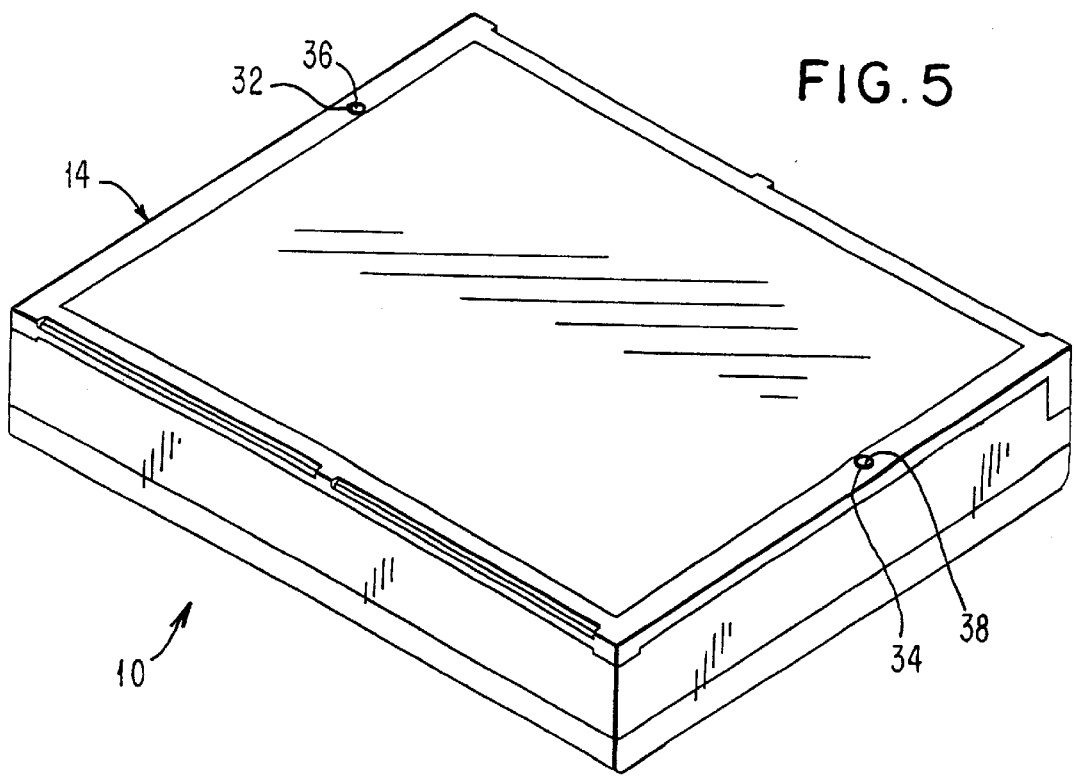
FIG. 5 represents a bottom front perspective view of the embodiment of the portable personal computer shown in FIG. 1 including two sensors to detect whether the stand is in a stowed or deployed position.
Figure 6:
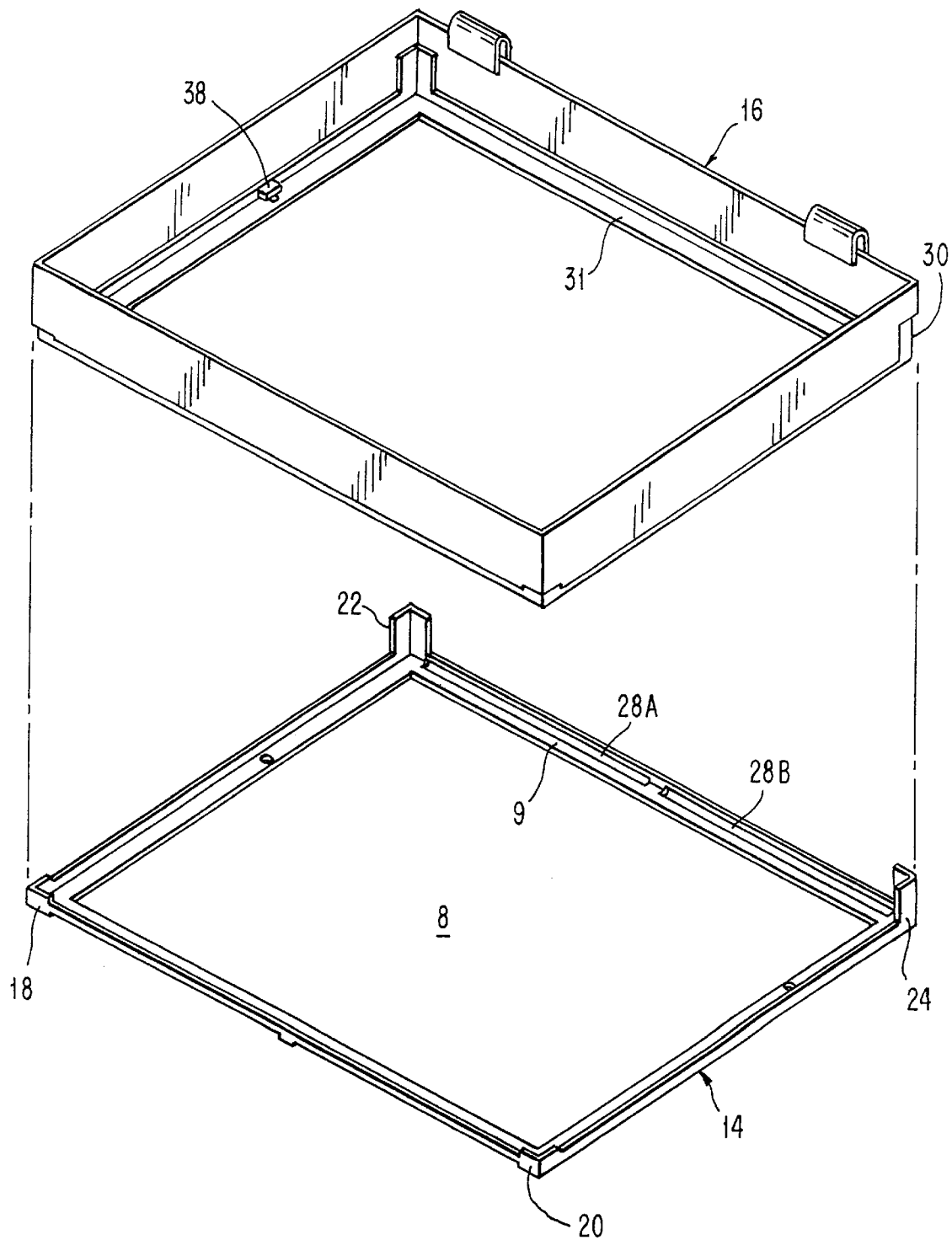
FIG. 6 represents a top front perspective view of the embodiment of a portable personal computer shown in FIG.
Figure 7:
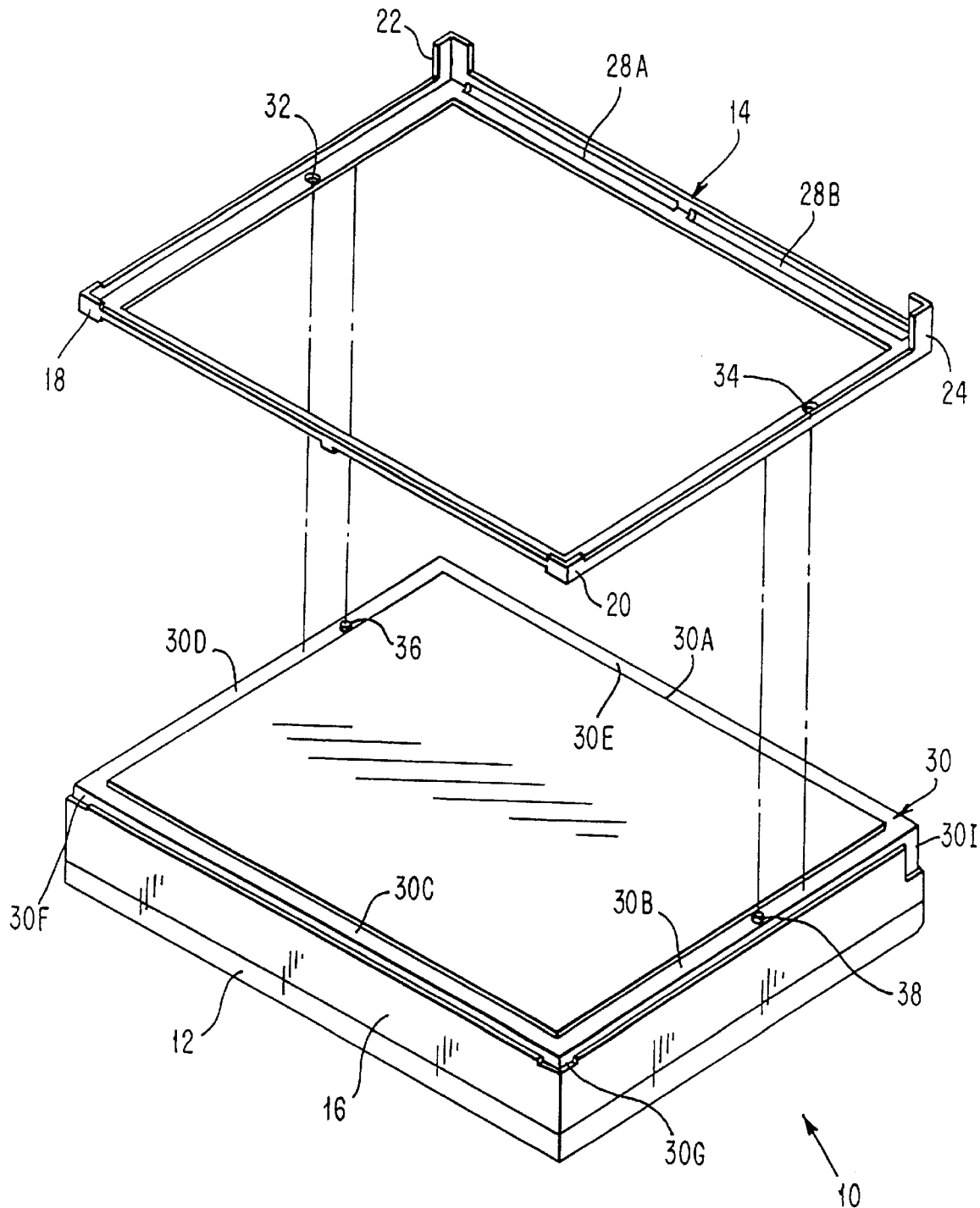
Figure 8:
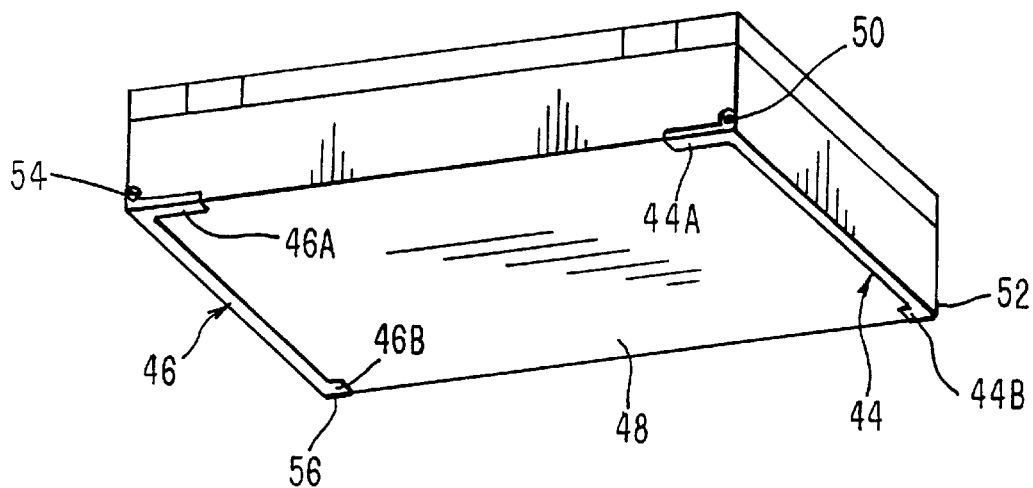
Figure 9:
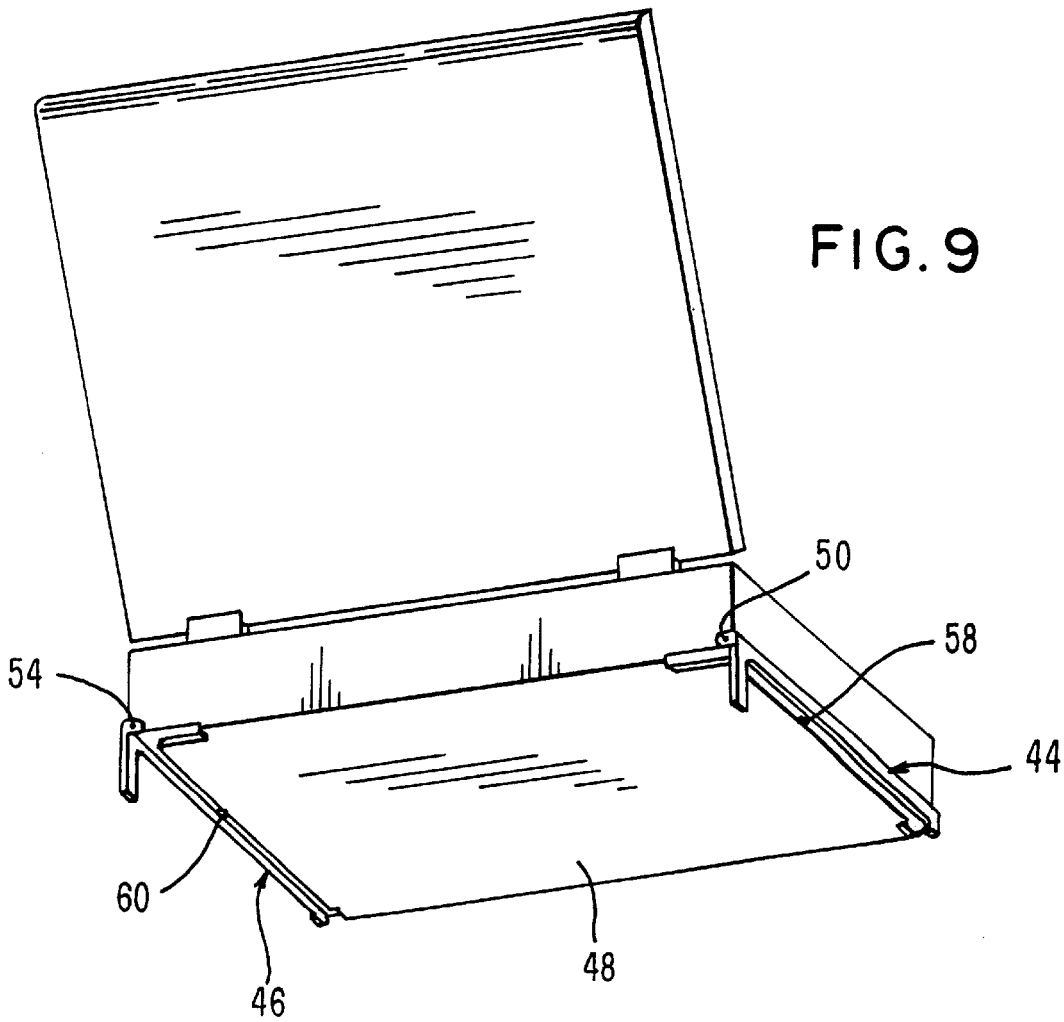
Figure 10:
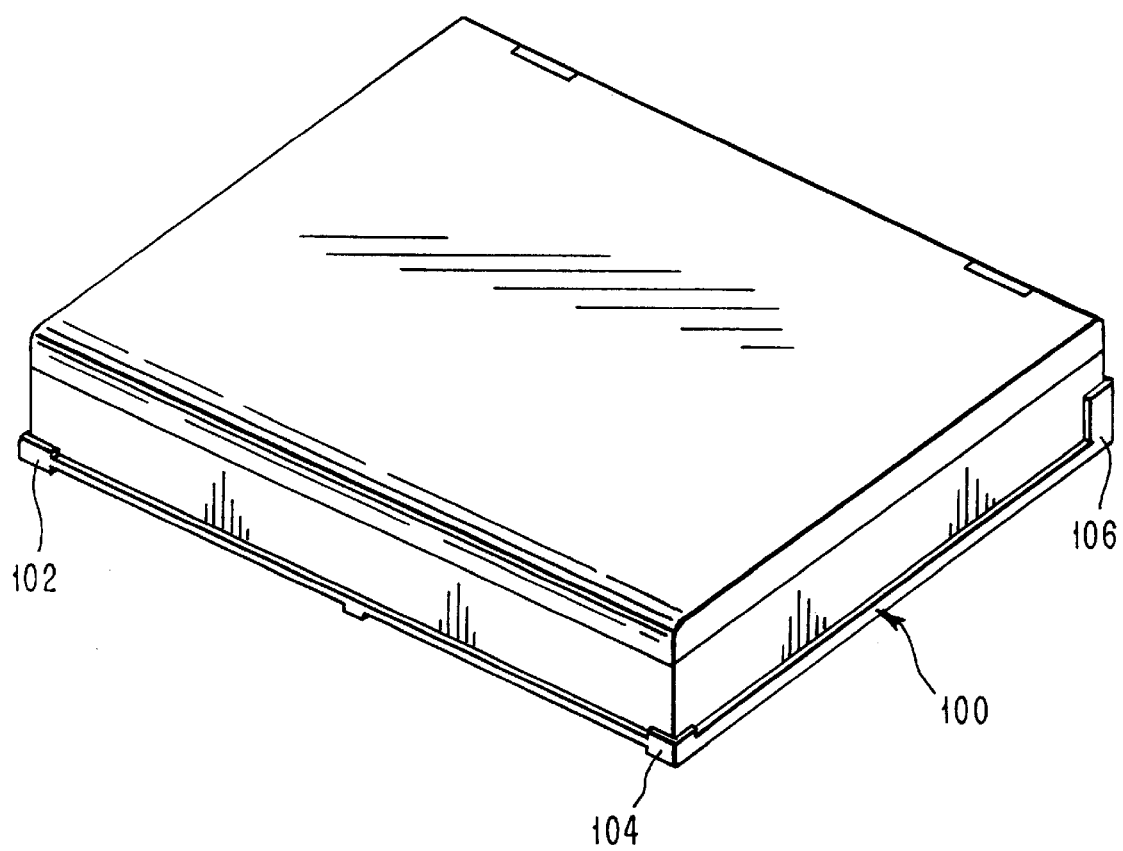
Figure 11:
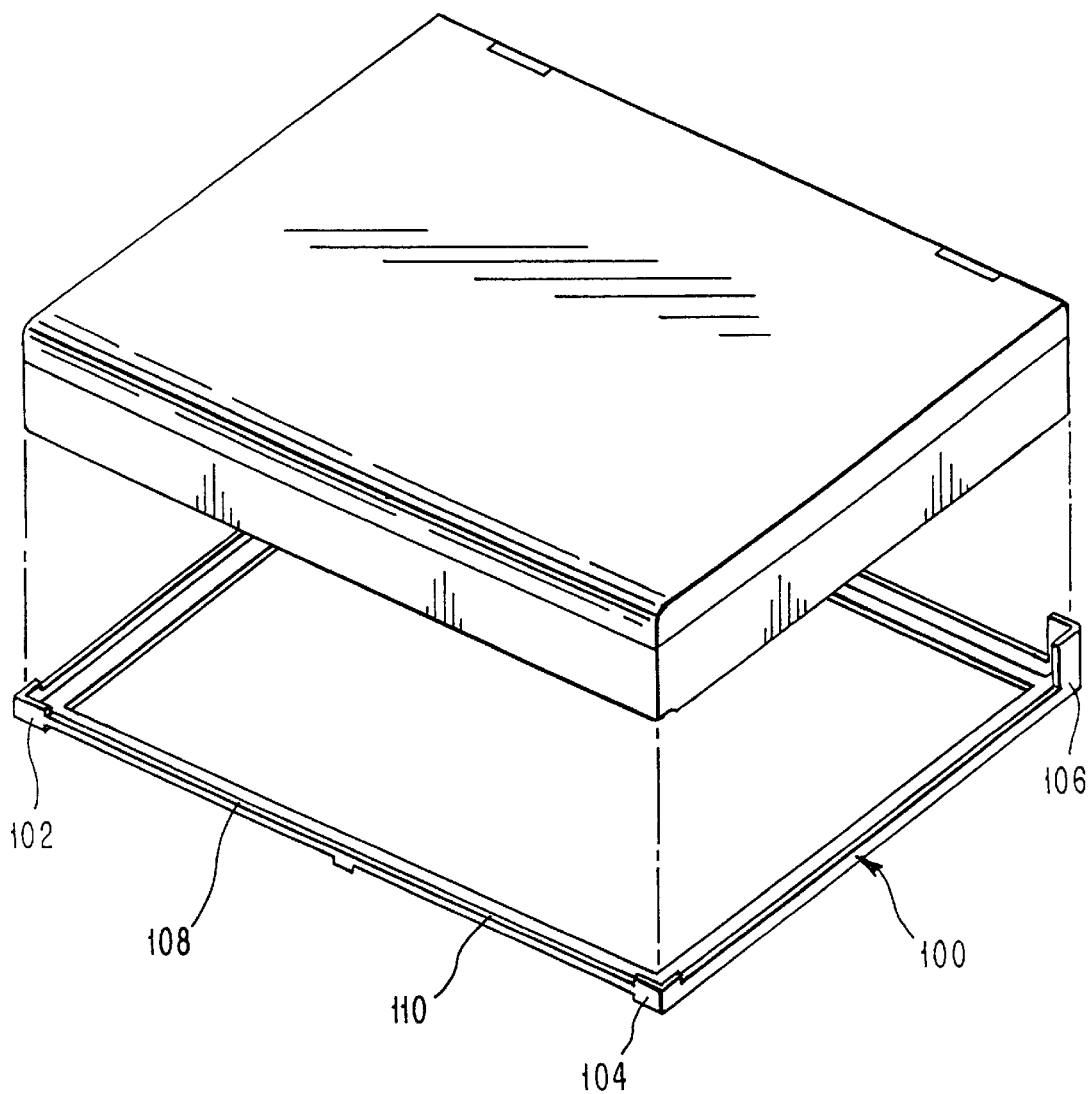
Figure 12:
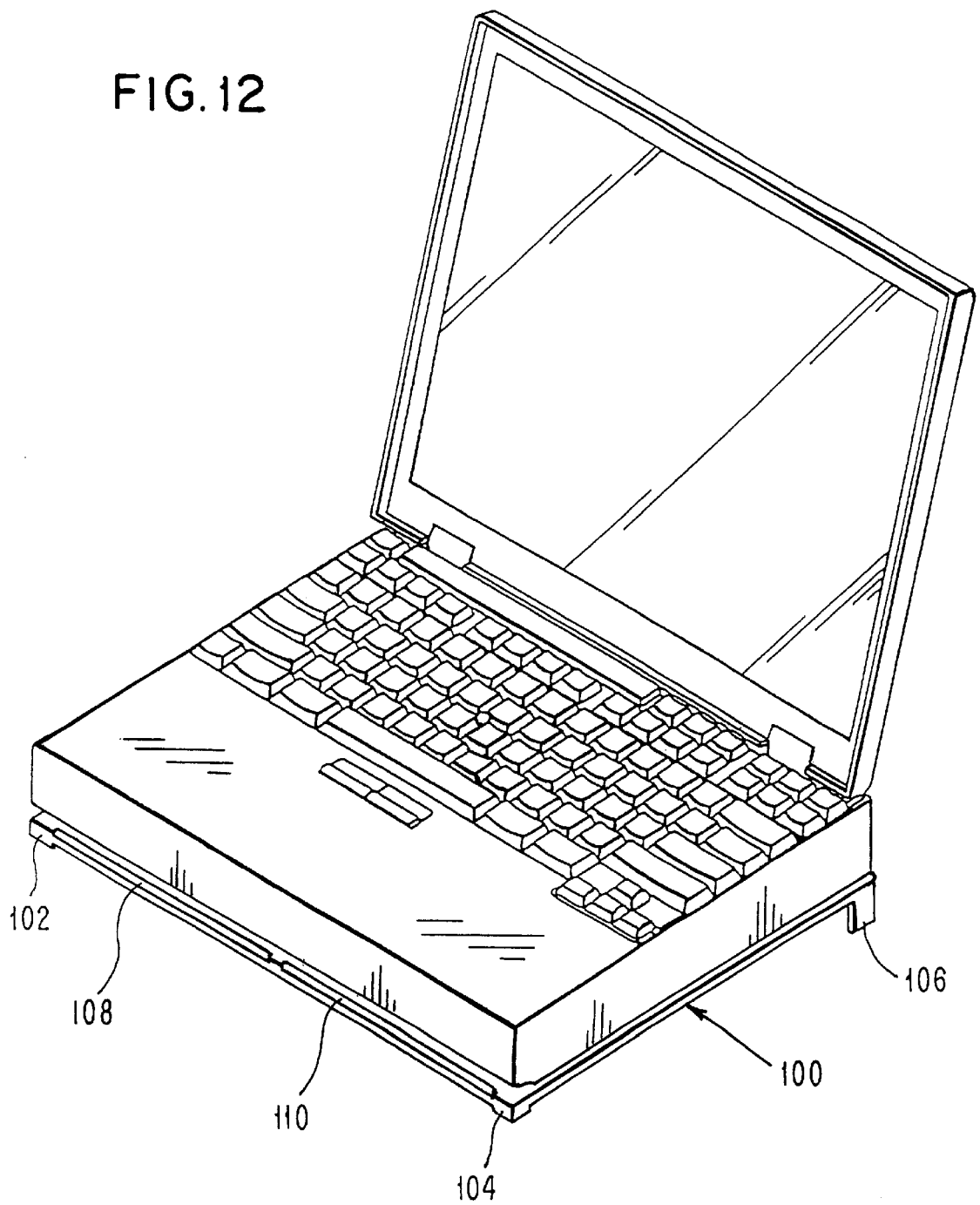

1 with the display panel and elements that normally reside in the base of the computer such as the keyboard, processor, and disk drive, removed with the stand removed from the base of the computer;

FIG. 7 represents a bottom front perspective view of the embodiment shown in FIG. 5 and FIG. 6 with the stand detached from the base of the computer and illustrating the spatial relationship between the stand and base of the computer as the stand is moved between a stowed position and a deployed position;

FIG. 8 represents a bottom rear perspective view of a further embodiment of a portable personal computer including a stand according to the present invention with its display panel in a closed position and with the stand in a stowed position;

FIG. 9 represents a top front perspective view of the embodiment of a portable personal computer shown in FIG. 8 with the display panel in an open position and with the stand in a deployed position;

FIG. 10 represents a top front perspective view of an embodiment of the present invention that may be utilized with existing portable personal computers with its display panel in a closed position and with the stand in a stowed position;

FIG. 11 represents a top front perspective view of the embodiment shown in FIG. 10 with the stand detached from the base of the computer and illustrating the spatial relationship between the stand and base of the computer as the stand is moved into the stowed position; and FIG. 12 represents a top front perspective view of the embodiment of a portable personal computer shown in FIG. 10 and FIG. 11 with the display panel in an open position and with the stand in a deployed position.

DETAILED DESCRIPTION OF VARIOUS AND PREFERRED EMBODIMENTS OF THE INVENTION

Heat dissipation for portable personal computers, also known as "laptop computers", can be enhanced by exposing a greater surface area of the computer to ambient air. One surface on a portable personal computer that often is not exposed to the ambient air is the bottom of the base of the computer. It has been shown that raising the back end of the base of a portable personal computer above a surface, such as a table, desk, or user's lap, the computer sits on permits natural convection to take place on the bottom surface. This enhances cooling capability of the computer.

One surface on a portable personal computer that often is not exposed to the ambient air is the bottom surface of the base of the portable personal computer. Through the present invention, it has been shown that raising the back end of the bottom surface of the base of a portable personal computer above a surface supporting the computer will allow natural convection to take place on the bottom surface of the computer base and thus enhance cooling capability.

For example, according to one embodiment of the present invention, raising the back end of a portable personal computer by from about 15 mm to about 20 mm increases heat dissipation just under about two watts. According to another embodiment, a rise of the back bottom end of the computer by about 30 mm increases heat dissipation by almost about three watts. Since not raising the back typically permits approximately five watts of heat to be dissipated from a portable personal computer, the present invention can increase natural convection cooling on the order of from about 35% to about 50%. In other cases the cooling may be greater.

Of course, the amount of heat dissipated from a portable personal computer may vary, depending upon the design of the computer, the materials utilized in making the computer components, such as the base, the thickness of the base, allowable temperature rise above ambient, the uniformity of outside surface temperature, and other factors. However, once aware of the contents of the disclosure herein, without undue experimentation, one skilled in the art could determine the amount of cooling desired and a corresponding level that the back bottom end of the base of the computer must be raised to result in the desired degree of cooling.

The present invention provides a stand that can raise at least a portion of a bottom surface of the base of a portable personal computer off of a surface that supports the computer. The present invention may provide a stand for supporting a portable personal computer without substantially increasing the size, complexity and/or weight of the computer. Deploying the stand of the invention raises at least a portion the bottom of a portable personal computer, thus allowing ambient air to convect additional heat away from the computer's bottom surface. Dissipating heat may prevent damage to components of the computer and/or degradation of the components' performance. Additionally, increased heat dissipation characteristics may permit higher performance processors and/or other components to be included in a portable personal computer and additional components, such as additional drives, to be included in the computer.

Figure 1:
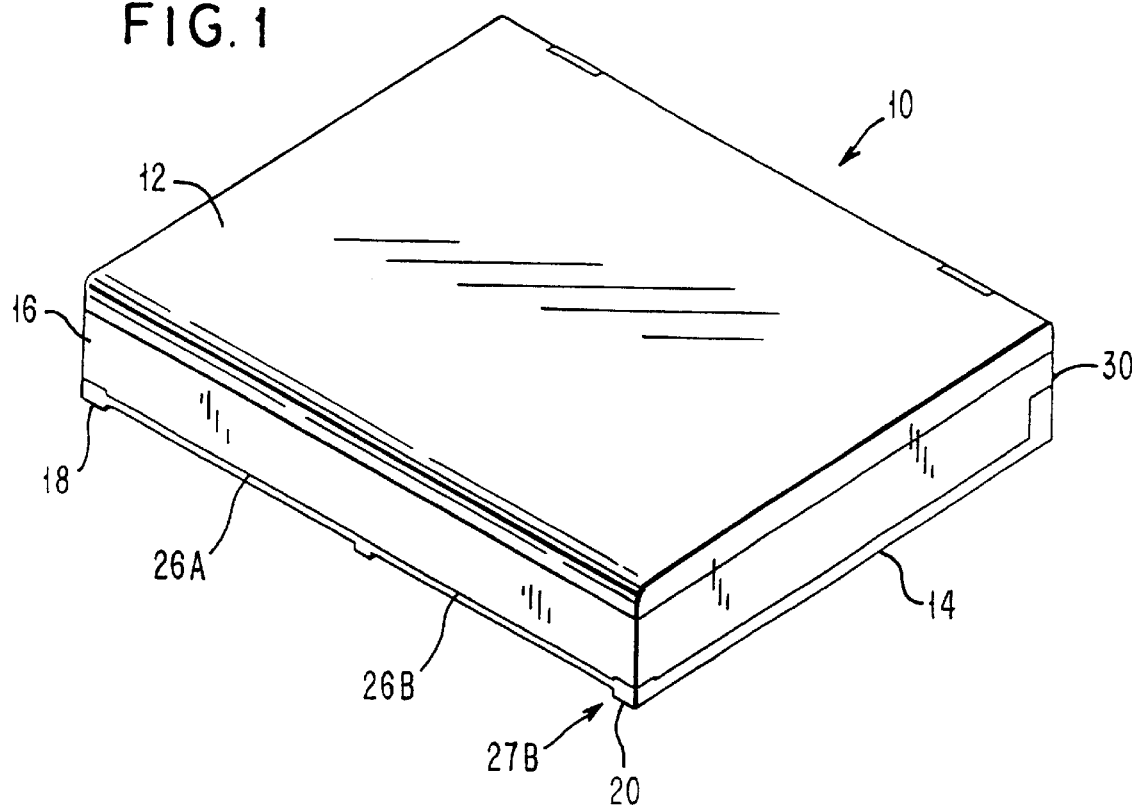
FIG. 1 represents a top front perspective view of an embodiment of a portable personal computer including a stand according to the present invention with its display panel in a closed position and with the stand in a stowed position.

FIG. 1 illustrates a perspective view of an embodiment of a portable personal computer 10 according to the present invention. The portable personal computer typically includes a display panel 12 and a base or bottom cover 16. The portable personal computer shown in FIG. 1 is shown with its display panel 12 in a closed position.

Figure 2:
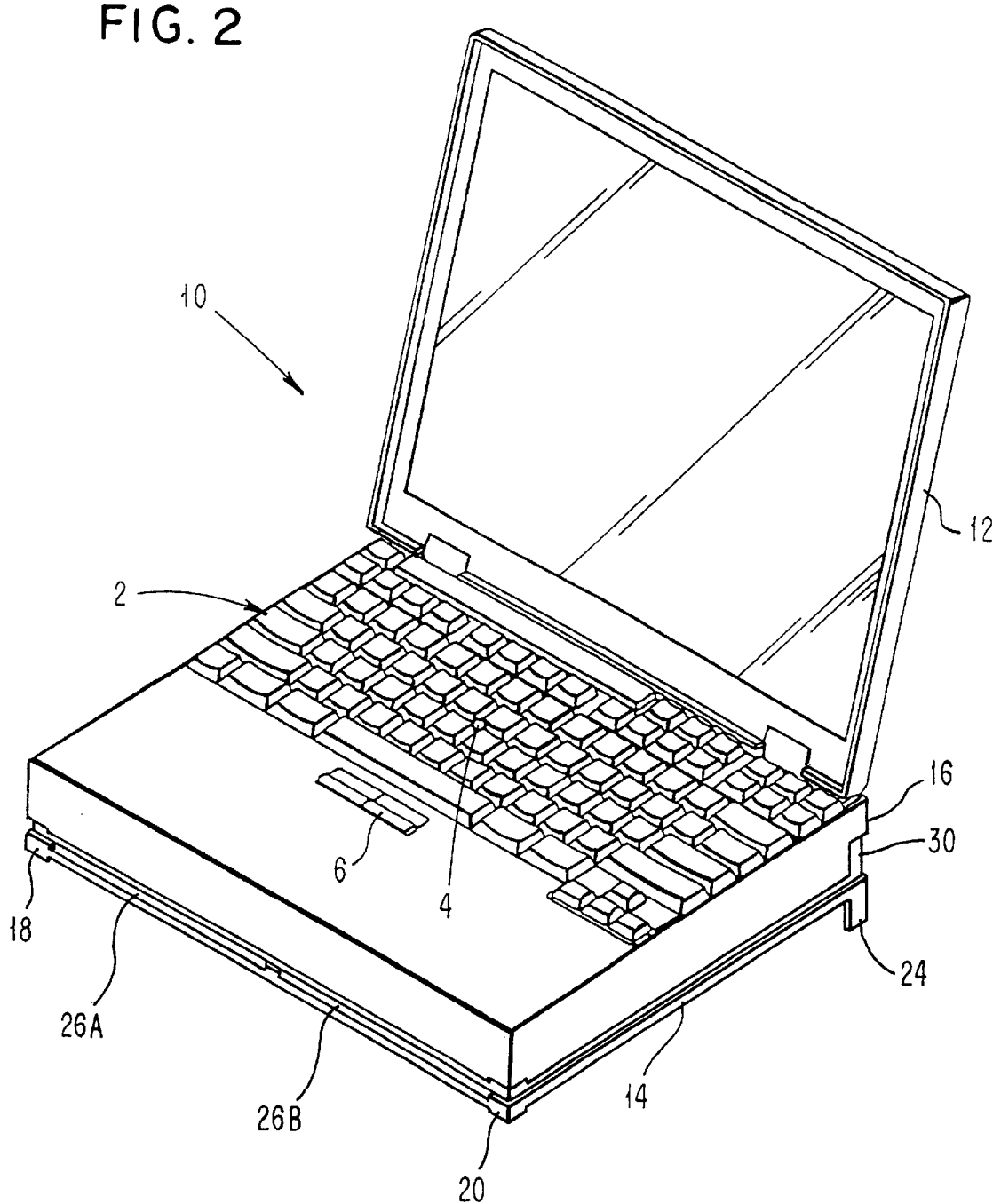
FIG. 2 represents a top front perspective view of the embodiment of a portable personal computer shown in FIG. 1 with the display panel in an open position and with the stand in a deployed position.

FIG. 2 illustrates the computer with its display panel 12 in an open position. The exact position of the display panel 12 in an open position may vary, depending upon the position that the operator determines is best for viewing the display panel.

As shown in FIG. 2, the base 16 of the portable personal computer typically houses, among other things, the central processing unit (not shown), memory (not shown), a keyboard 2, pointing device 4, clicking device 6, modems (not shown), speakers (not shown), and drives (not shown), such as hard disk drive, floppy disk drive, cd-rom drive, digital video disk drive. Of course, different portable personal computers have different configurations. Also, the different portable personal computers may have appearances that differ from the computer shown in FIG. 2.

The portable personal computer shown in FIG. 1 also includes an embodiment of a removable stand 14 according to the present invention. The stand shown in FIG. 1 is in a stowed position. In the stowed position, the stand may be nested into the bottom cover 16 of portable personal computer 10. As discussed below in greater detail, the bottom cover may include at least one depression for receiving and/or engaging at least a portion of the stand.

The embodiment of the stand of the present invention shown in FIG. 1 includes a single stand member 14. Other embodiments of the stand may include more that one stand member. One such example is discussed below in greater detail. The stand member shown in FIG. 1 includes a rectangular-shaped frame member having substantially the same shape as the base 16 of the computer 10.

The at least one stand member includes a bottom surface. As shown in FIG. 1, the bottom surface of the stand member may include at least one slot 26A. The slots may serve to provide at least some access for ambient air to the bottom surface of the base of the computer while the stand is in the stowed position. In such a case, the stand may provide some possibility for cooling the computer even if it is not deployed. As discussed above, the slots 26A and 26B may also help to further enhance the cooling of the computer when the stand is in the deployed position. Alternatively, the lower edge of the stand member, wherein the stowed position, may be linear, without any slots.

As shown in FIG. 1, the stand member includes a bottom surface that engages at least portions of a surface that the computer is placed upon. The bottom surface may include elements to engage the surface supporting the computer. For example, non-skid material could be applied to the bottom surface of the stand member. The slots may also form corners 27B that could engage a pliable surface to help maintain the computer stationary.

FIG. 6 provides a view of an embodiment of the stand member 14 separated from the base. The embodiment of the computer base and stand shown in FIG. 6 also includes sensors 38 that will be discussed in greater detail below. As shown in FIG. 6, the stand member may have a generally L-shaped cross section. The central portion of the stand includes at least one opening for permitting ambient air access to the bottom of the computer base. However, the entire area of the opening 8 need not be open.

The opening 8 shown in FIG. 6 may be surrounded by a lip 9. The lip may engage a depression 30 formed in the outside surface of the base 16 both in the stowed position and in the deployed position. By engaging the depression, the lip may help to maintain the stand in place on the base in both the stowed and deployed positions.

The embodiment of the stand shown in FIG. 6 includes upwardly extending feet members 18, 20, 22, and 24 that, when in the deployed position may each engage a portion of a surface that the computer is supported by. Although the embodiment of the stand shown in FIG. 6 includes four legs, the stand need only include at least one leg so as to raise the bottom surface of the base above a surface that the computer is supported by when the stand is in the deployed position.

Figure 4:
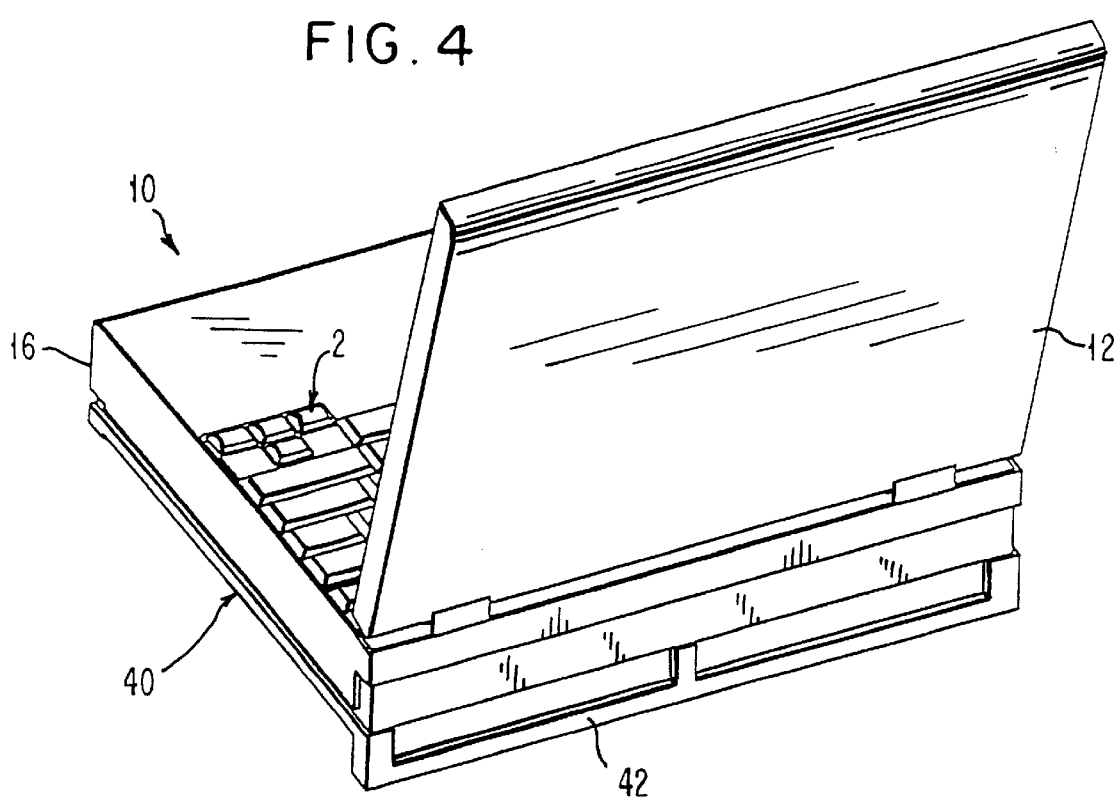
FIG. 4 represents a top rear perspective view of another embodiment of a portable personal computer with the display panel in an open position and with the stand in a deployed position.

For example, the stand member 14 could include only one leg arranged on the rear edge of the stand. FIG. 4 illustrates an embodiment that includes a leg member 42 that extends along the entire length of the rear edge of the stand in the deployed position. The embodiment shown in FIG. 4 includes larger slots than the embodiment shown in FIG. 6 to as to provide ambient air access to the bottom surface of the base that is provided by the open space between the legs in the embodiment shown in FIG. 6.

Any of the legs could be replaced with a leg extending a substantial portion of the length of a side of the stand. Such embodiments preferably would include enlarged slots provided in the extended leg as in the embodiment shown in FIG. 4 so as to recapture heat dissipation lost to the solid extensive leg.

The vertical length of the leg(s) may depend upon the amount of cooling that is desired when the stand is in the deployed position.

In a deployed position, the embodiment of the stand shown in FIG. 2 permits the portable personal computer 10 to rest on front legs 18 and 20 and rear legs 22 and 24. In this embodiment, rear legs 22 and 24 are higher than front legs 18 and 20. However, all of the legs could have the same length or the front legs could be longer.

Having the rear legs longer may permit heated ambient air under the bottom surface of the computer base to escape from the rear of the computer base and draw cooler ambient air under the bottom surface of the base by way of the front of the base. With the stand in a deployed position, if the difference in height between front legs 18 and 20 and rear legs 22 and 24 is about 15 mm approximately 1.5 to approximately 2 additional watts of heat can be dissipated from the computer as compared to if the stand is not used or not included in the computer design. If the difference in height is about 30 mm, about 2.5 to about 3 additional watts can be dissipated.

As discussed above, the stand may include slots 26A and 26B to enhance air movement and thus cooling. Additionally, the stand may include slots 28A and 28B cut into the rear of the stand member.

With the stand in the stowed position as shown in FIG. 1, at least a portion of the stand may be received by a depression 30 provided in the base 16 of the computer. In the embodiment shown in FIG. 1, the depression sufficiently large so as to accommodate substantially the entire thickness of the stand member within the depression. Such a depression should have a depth and a thickness sufficient to receive the stand such that when in the stowed position, the outside surface of the stand is flush with the outside surface of the base of the computer. As shown in FIG. 1, such a depression may also have a shape corresponding to the shape of the stand member. According to such an embodiment, the stand member may result in no increase in the outside dimensions of a portable personal computer. This may permit the most efficient space use when the stand is in its stowed position.

FIG. 7 provides a more complete external view of the embodiment of the depression 30 shown in FIG. 1. As can be seen in FIG. 7, the depression 30 may extend along both the sides and the bottom surface of the computer base 16. The embodiment of the depression shown in FIG. 7 mirrors the interior cross sectional shape of the stand member.

Accordingly, the embodiment of the depression shown in FIG. 7 includes portions 30B, 30C, 30D, and 30E for engaging the sides of the sides of the stand. Additionally, the embodiment of the depression shown in FIG. 7 may also include stand member leg receiving portions 30F, 30G, and 30F for engaging the legs 18, 20, 22, and 24 of the stand member when the stand member is in the stowed position. However, as discussed herein, the depression need not mirror the shape of the stand around its entire length.

FIG. 6 also illustrates an embodiment of how the interior surface of the base may be altered by forming the depression in the base to accommodate the stand. As shown in FIG. 6, the depression may result in the production of a protrusion 31 extending into the interior of the base 16. Differently configured stands and/or depressions may result in different configured protrusions.

The depression may define a lip 30A on the bottom surface of the base 16. The lip 30A may engage the stand both in the stowed position and in the deployed position. Frictional forces between the surface of the base within the depression and the stand may help to maintain the stand in place on the base 16 both in the stowed position and in the deployed position.

According to other embodiments, the depression may not accommodate all of the stand. In fact, the computer base need not include any depression as long as either the stand member of the computer base include means for retaining the stand member on the computer base. For example, in addition to or in place of a depression in the base, the stand and/or the base could include tabs and/or detents in corresponding positions for receiving the tabs. In the stowed position, the tabs and the detents could engage each other to maintain the stand in place on the computer base.

The stand and/or the base could also include other means for maintaining the stand in place on the base. For example, at least one latch or strap could be provided on the stand and/or the base. Means other than a depression for maintaining the stand in place on a portable personal computer may make it easier to retrofit exiting computers to include a stand according to the present invention without the need for major redesign of the computer and/or the internal arrangement of components within the base.

FIG. 2 illustrates the embodiment of the portable personal computer shown in FIG. 1. However, as described above, FIG. 2 illustrates the stand in a deployed position. FIG. 2 also provides a view of the depression 30 exposed by the movement of the stand from the stowed position shown in FIG. 1 to the deployed position shown in FIG. 2. When moving the at least one stand member 14 from the stowed position to the deployed position, it is removed from the computer base 16, turned over so that the bottom surface in the orientation shown in FIG. 1 faces upward.

Figure 3:
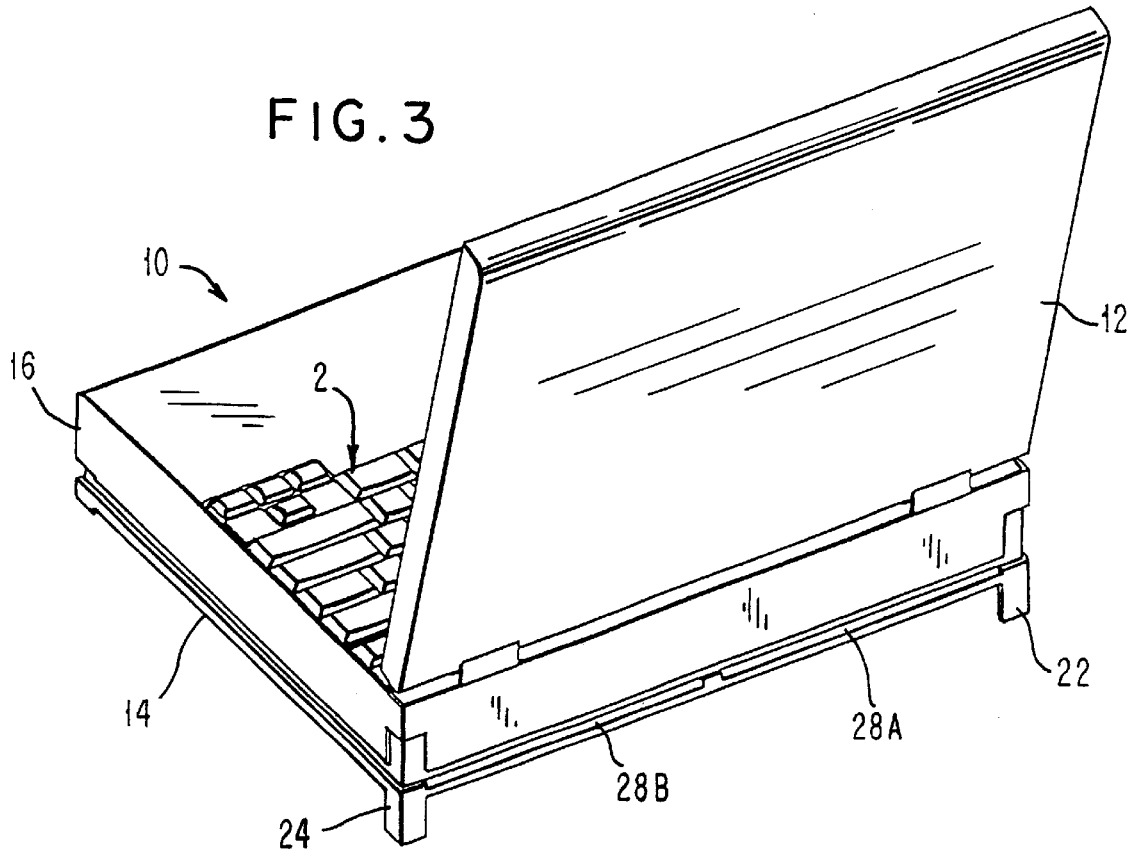
FIG. 3 represents a top rear perspective view of the embodiment of a portable personal computer shown in FIG. 1 with the display panel in an open position and with the stand in a deployed position.

FIG. 3 illustrates the embodiment of the stand and computer shown in FIG. 2 from the rear of the computer and the stand. Cooling slots 28A and 28B are clearly visible in the view shown in FIG. 3.

FIG. 4 shows a rear top perspective view of another embodiment of the stand member 40. As described above, the stand 40 includes a single rear leg or bar 42 instead of two distinct rear legs contacting a portion of the surface the computer rests on. An advantage of the embodiment of the stand 40 is that it may be more easily used when the computer is used on a person's lap. A disadvantage of this embodiment is that it may take up slightly more room as compared to an embodiment that includes two discrete rear legs.

Since not all tasks that a computer can carry out require maximum cooling, it is possible to operate the portable personal computer without deploying the stand. Thus, a portable personal computer that includes a stand according to the present invention may operate in different modes with different cooling capacities. In one mode, the stand is in a deployed position and the cooling enhanced. In another mode, the stand is in a stowed position and the cooling capacity of the computer is reduced relative to when the stand is in a deployed position.

In each of these modes, certain components of the computer may operate, while others may not. For example, when the stand is in a stowed position, certain component of the computer may generate too much heat for all components of the computer to optimally function. In fact, the heat may degrade or damage some components. Therefore, it is desirable not to experience degrading performance or damage to components of the computer. For example, a CD-ROM drive may generate too much heat for the portable personal computer to handle with the stand in the stowed position.

In view of the above, a portable personal computer may include a provision for detecting whether or not the stand is deployed. By knowing whether the stand is not in the deployed position, certain components of the computer may be prevented from functioning because heat generated by the component would exceed the cooling capacity of the computer.

There are many ways to accomplish the task of detecting if the stand is in the stowed position or the deployed position and even if the stand is correctly deployed. FIG. 5 illustrates one embodiment that includes switches or sensors 36 and 38 in the computer base. The portable personal computer and/or the base may include at least one switch and/or at least one sensor. The switch may detect when the stand is in the stowed position and/or in the deployed position.

The computer base and/or the stand may also include at least one passage. The embodiment shown in FIG. 5 includes two passages 32 and 34. The passages may permit the computer to engage the switches to detect when the stand is in a deployed position as compared to a stowed position. The passage(s) may also help to detect if the stand is properly stowed and/or deployed.

In the embodiment shown in FIG. 5, the two passages 32 and 34 and the switches 36 and 38 are asymmetrically provided on the stand and the base, respectively. In the stowed position, the switches protrude through the passages such that the switches are not engaged. When stand 14 is in the deployed position, the switches are engaged.

The function of detecting whether the stand is in a deployed or stowed position can also be accomplished with one switch. Having two switches makes accidental misreadings less likely. Of course, one skilled in the art could determine different placement of switches and/or passages, number of switches and/or passages, types of switches, and other alterations without undue experimentation once aware of the disclosure contained herein.

FIG. 6 illustrates the placement of the switches in the embodiment shown in FIG. 5 from inside the base of the computer. FIG. 7 depicts the alignment of the base 16 and the stand member 14 and how the computer would operate two asymmetrically arranged switches when the stand is in the deployed position.

Using a detection system, for example as described above, can then allow a portable personal to operate in two different modes, one in which greater cooling is available than the other. According to one embodiment, the computer keeps track of what components of the computer are running and their known heat production and dissipation. The computer would allow a feature to run only if the power budget of the computer is not exceeded.

When stand 14 is in a deployed position, it is sensed by the computer. The computer in turn permits components to operate using the higher power dissipation budget. When the stand is in a stowed position or not deployed, a lower heat production and dissipation budget is used. The lower heat production and dissipation budget may prevent certain components of the computer to operate.

According to another embodiment, a portable personal computer could includes an active cooling device. One example of an active cooling device is a fan. A fan could provide additional cooling over and above the passive natural convection of the computer, whether or not the stand is in a stowed or deployed position.

When the stand is detected in the deployed position and the computer is running, the active cooling device is turned off. The fan may also be off if the stand is not deployed if the heat production and dissipation of the active components of the computer do not exceed a certain level above which the function and integrity of the components could be compromised. Furthermore, the fan could run with the stand in a deployed position if the heat production and/or cooling capacity of the computer require it to operate. The fan may also operate with the stand in a deployed position so as to permit additional components of the computer to be operate.

Otherwise, the active cooling device may be turned off if the computer is running and/or the heat production and heat dissipation of the portable personal computer do not require it to be on.

According to another embodiment, a combination of fan operation and stand deployment are utilized, whereby the computer operates as described above with two alternate power budgets. However, when a component of the computer is about to be supplied with power on and the heat budget of the computer would be exceeded, the active cooling device may be turned on. If the active cooling device is on and a component would exceed the power budget, the computer may not permit power to be supplied to the component. Of course, a message could be put on the screen that would inform the operator of the condition and could give information about alternatives such as shutting down another component.

A further embodiment relates to a portable personal computer includes at least one temperature sensor for sensing the temperature of the computer. The at least one temperature sensor could be specifically directed to sense a critical temperature of the computer. One example of a critical temperature includes the processor temperature. The at least one temperature sensor may be tied into the processor, just as the switches described above can be. The processor could allow or disallow an additional feature or features to be turned on, depending upon the value of the sensed temperature. Again, this embodiment could include an active cooling device.

The stand of the present invention may include more that one stand member. The stand may also be fixed to the base of the portable personal computer. For example, the stand member(s) could be hingedly interconnected with the base. According to one example, the stand includes at least one stand member hingedly connected to the base. Illustratively, the stand could include one leg member hingedly connected to the base of the computer such that the leg member extends downwardly away from at least a portion of the rear edge of the base. Similar to above, the stand member(s) could include slots to enhance cooling of the computer.

FIG. 8 and FIG. 9 illustrate another embodiment of the invention. In the embodiment shown in FIG. 8 and FIG. 9, the legs are not part of a removable stand. Rather, the embodiment of the present invention shown in FIG. 8 and FIG. 9 includes two stand members 44 and 46 hingedly connected to the computer base. Each stand member includes at least one leg. Each leg may extend along a portion of the stand member. According to one embodiment each leg may extend substantially the entire length of each stand member.

Each stand member 44 and 46 in the embodiment shown in FIG. 8 and FIG. 9 includes two leg members 44A and 44B and 46A and 46B, respectively. The stand members shown in FIG. 8 and FIG. 9 are hingedly connected to the portable personal computer base 48. Stand member 46 is hingedly connected to the portable personal computer base at pivot points 54 and 56. Stand member 44 is hingedly connected to the base at pivot points 50 and 52.

According to still another embodiment, the stand members could extend and pivot along the front and rear edges of the base instead of the left and right edges as shown in FIG. 8 and FIG. 9. Alternately, all four legs could pivot independently, each representing a stand member.

An embodiment that includes stand member(s) hingedly connected to the base may also include at least one switch, passage, and/or sensor as described above. The embodiment shown in FIG. 8 and FIG. 9 includes two switches and/or sensors 58 and 60. These switches and/or sensors may serve a similar purpose to switches and/or sensors 36 and 38 described above. Switches and/or sensors 58 and 60 could determine if how many stand members are deployed.

As can be seen in FIG. 8 and FIG. 9, the base may include at least one depression for receiving the stand member(s). The embodiment shown in FIG. 8 and FIG. 9 includes two depressions, one for each stand member. The above discussion regarding the depression as well as any other aspects of the stand applies here to hingedly connected stand members as well.

The present invention also includes a portable personal computer that includes a stand as described above. The computer may include a base including a bottom surface, a back side, a front side, a left side, a right side, and a bottom surface. A display may be hingedly interconnected with the base. The computer may also include at least one stand member interconnectable with the base. The at least one stand member may be positionable in a deployed position and a stowed position. In the deployed position the at least one stand member supports at least one portion of the bottom surface of the base at an elevated level with respect to a surface that the portable personal computer is supported by. The at least one stand member engages at least a portion of the surface of the base in the stowed position.

Additionally, the present invention includes a method for thermal management in a portable personal computer including a base, a front side, a back side, a right side, a left side, a bottom surface, and at least one stand member interconnectable with the base. The at least one stand member is positionable in a deployed position and a stowed position, wherein in the deployed position the at least one stand member supports at least one portion of the bottom surface of the base at an elevated level with respect to a surface that the portable personal computer is supported by. The at least one stand member engages a surface of the base or is retracted within the computer in the stowed position. The method includes detecting whether the at least one stand member is in a deployed or a stowed position or a temperature of the portable personal computer and activating selected components in the computer such that the heat output by the activated devices do not exceed the cooling capacity of the computer or a predetermined heat output.

The present invention may also be configured to be used with existing portable personal computers. Such embodiments may or may not engage the housing, such as the base, of the computer. Such embodiments could have a similar shape to the embodiments shown in FIGS. 1–5. However, rather than engaging a lip such as lip 30A that may be included on the bottom surface of the base, the stand could include at least one stand member that includes at least one element that engages at least a portion of the bottom surface and/or at least one of the side surfaces of the computer. Such embodiments could still include at least one leg for supporting at least a portion of the base of a computer elevated above a surface that supports the computer. Such embodiments could also still include cooling slots.

One such embodiment could have an L-shaped cross section. However, unlike the embodiments described above, the L-shape could engage the corners of the computer base and portions of the sides and bottom surface of the computer adjacent the corners. The L-shaped portion and/or another L-shaped portion could also engage the computer in a deployed position.

In fact, the embodiment shown in FIGS. 10–12 could be substantially similar to the embodiments shown in FIGS. 1–7 but have a slightly increased inner dimension. That is, the distance between the legs and the arms of the L-shape in a direction parallel to the major plane of the stand on the side of the legs and arms of the L-shape facing the opening 8 could be slightly increases. This increase in dimension permits the stand to be used with existing computers that do not include a depression.

Alternatively, the stand member could have a shape substantially similar to the shape shown in FIGS. 1–7. Such an embodiment is shown in FIG. 10, FIG. 11, and FIG. 12. The embodiment of the stand shown in FIGS. 10–12 includes a single stand member 100 having an L-shape with an internal dimension larger than the base of the computer to enable the computer to frictionally attach the computer in a stowed position.

The stand member 100 includes feet 102, 104, and 106. Additionally, the stand member includes cooling slots 108 and 110 that function as described above.

An embodiment for use with existing computers could include some means, such as non-skid material, lips, tabs, straps, and/or any other means for maintaining the stand on the computer in a deployed position.

FIG. 11 illustrates the embodiment shown in FIG. 10. However, FIG. 11 shows the stand detached from the computer. The lines shown in FIG. 11 illustrate the positioning of the stand member relative to the computer. FIG. 12 illustrates the stand shown in FIGS. 10 and 11 in a deployed position. In the deployed position, the stand could frictionally and/or adhesively engage the computer or could include structure for engaging the computer. Other means may also be employed for maintaining the computer on the stand.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A stand for a portable personal computer including a base including a front side, a back side, a right side, a left side, and a bottom surface, said stand comprising:

at least one stand member detachable from and interconnectable with a base of a portable personal computer, said at least one stand member being positionable in a deployed position and a stowed position, wherein said stand member is detached from the portable personal computer when moved between said deployed position and said stowed position, wherein in said deployed position said at least one stand member supports at least one portion of said bottom surface of said base at an elevated level with respect to a surface that the portable personal computer is supported by, said at least one stand member engaging a surface of said base in said stowed position.

2. The portable personal computer stand according to claim 1, further comprising:

at least one depression in said base for receiving said at least one stand member when said at least one stand member is in said stowed position, said depression having a shape substantially corresponding to a shape of at least a portion of said at least one stand member.

3. The portable personal computer stand according to claim 2, wherein said at least one stand member receiving depression is on at least one of said front side, said back side, said right side, said left side, and said bottom surface of said base.

4. The portable personal computer stand according to claim 1, wherein in said deployed position said at least one stand member supports all of said bottom surface of said base at an elevated level with respect to the surface that the portable personal computer is supported by.

5. The portable personal computer stand according to claim 1, including one stand member having a shape substantially corresponding to a shape of a perimeter of said bottom of said base.

6. The portable personal computer stand according to claim 1, wherein said at least one stand member includes at least one leg member, wherein in said deployed position said at least one leg member engages the surface that the portable personal computer is supported by.

7. The portable personal computer stand according to claim 1, wherein said at least one stand member includes four leg members, wherein in said deployed position said leg members engage the surface that the portable personal computer is supported by.

8. The portable personal computer stand according to claim 1, wherein in a deployed position said at least one stand member is oriented in an opposite direction with respect to said base as compared to when said at least one stand member is in a stowed position.

9. The portable personal computer stand according to claim 1, wherein said at least one stand member includes at least one opening for increasing airflow under said base when said at least one stand member is in a deployed position.

10. The portable personal computer stand according to claim 1, wherein said at least one stand member includes a plurality of openings for increasing airflow under said base when said at least one stand member is in a deployed position.

11. The portable personal computer stand according to claim 1, further comprising at least one opening between said at least one stand member and said base when said at least one stand member is in a deployed position for increasing airflow under said base.

12. The portable personal computer stand according to claim 1, further comprising a plurality of openings between said at least one stand member and said base when said at least one stand member is in a deployed position for increasing airflow under said base.

13. The portable personal computer stand according to claim 1, wherein said bottom surface of said base includes a rim recessed from an edge of said bottom surface, wherein said at least one stand member includes at least one rim about an upper surface for engaging a side of said base and an inner lip for engaging said edge on said bottom surface when said at least one stand member is in said stowed position, wherein said rim and said lip help to retain said at least one stand member on said base.

14. The portable personal computer stand according to claim 13, wherein in a deployed position said inner lip of said at least one stand member engages said rim on said bottom of said base.

15. The portable personal computer stand according to claim 1, wherein said at least one stand member has a shape substantially corresponding to the perimeter of said portable personal computer base and an interior opening.

16. The portable personal computer stand according to claim 1, further comprising a leg member having a length substantially similar to a length of the rear side of said portable personal computer.

17. The portable personal computer stand according to claim 1, wherein said at least one stand member has an L-shaped cross-section.

18. The portable personal computer stand according to claim 1, wherein when moving said at least one stand member between said deployed position and said stowed position, at least one stand member is separated from said base.

19. A portable personal computer, comprising:
- a base including a bottom surface, a back side, a front side, a left side, a right side, and a bottom surface;
- a display hingedly interconnected with said base; and
- at least one stand member detachable from and interconnectable with a base of a portable personal computer, said at least one stand member being positionable in a deployed position and a stowed position, wherein said stand member is detached from the portable personal computer when moved between said deployed position and said stowed position, wherein in said deployed position said at least one stand member supports at least one portion of said bottom surface of said base at an elevated level with respect to a surface that the portable personal computer is supported by, said at least one stand member engaging a surface of said base in said stowed position.

20. The portable personal computer stand according to claim 19, further comprising at least one sensor for sensing when said at least one stand member is in a non-deployed position.

21. The portable personal computer according to claim 20, wherein said at least one stand member receiving depression is on at least one of said front side, said back side, said right side, said left side, and said bottom surface of said base.

22. The portable personal computer stand according to claim 19, further comprising at least one sensor for sensing when said at least one stand member is in a deployed position.

23. The portable personal computer according to claim 19, further comprising:
- at least one depression in said base for receiving said at least one stand member when said at least one stand member is in said stowed position, said depression having a shape substantially corresponding to a shape of at least a portion of said at least one stand member.

24. The portable personal computer according to claim 19, including one stand member having a shape substantially corresponding to a shape of a perimeter of said bottom of said base.

25. The portable personal computer according to claim 19, wherein in a deployed position said at least one stand member is oriented in an opposite direction with respect to said base as compared to when said at least one stand member is in a stowed position.

26. The portable personal computer according to claim 19, wherein said at least one stand member includes at least one opening for increasing airflow under said base when said at least one stand member is in a deployed position.

27. The portable personal computer according to claim 19, further comprising at least one opening between said at least one stand member and said base when said at least one stand member is in a deployed position for increasing airflow under said base.

28. The portable personal computer according to claim 19, wherein said bottom surface of said base includes a rim recessed from an edge of said bottom surface, wherein said at least one stand member includes at least one rim about an upper surface for engaging a side of said base and an inner lip for engaging said edge on said bottom surface when said at least one stand member is in said stowed position, wherein said rim and said lip help to retain said at least one stand member on said base.

29. The portable personal computer according to claim 28, wherein in a deployed position said inner lip of said at least one stand member engages said rim on said bottom of said base.

30. The portable personal computer according to claim 19, wherein said at least one stand member has a shape substantially corresponding to the perimeter of said portable personal computer base and an interior opening.

31. The portable personal computer according to claim 19, wherein when moving said at least one stand member between said deployed position and said stowed position, at least one stand member is separated from said base.

32. A stand for a portable personal computer including a base including a front side, a back side, a right side, a left side, and a bottom surface, the stand comprising:
- two stand members hingedly connected to the base and positionable in a deployed position and a stowed position, wherein in the deployed position one stand member extends downwardly from each of the right side and the left side of the base to support the bottom surface of the base at an elevated position with respect to a supporting surface that the computer is placed on, and in the stowed position the stand members engage surfaces of the base in the stowed position.

33. The stand according to claim 32, wherein the two stand members are each hingedly connected to the back side and the front side of the base.

34. A portable personal computer, comprising:
- a base including a bottom surface, a back side, a front side, a left side, a right side, and a bottom surface;
- a display hingedly interconnected with said base; and
- two stand members hingedly connected to the base and positionable in a deployed position and a stowed position, wherein in the deployed position one stand member extends downwardly from each of the right side and the left side of the base to support the bottom surface of the base at an elevated position with respect to a supporting surface that the computer is placed on, and in the stowed position the stand members engage surfaces of the base in the stowed position.

35. The portable personal computer according to claim 34, wherein the two stand members are each hingedly connected to the back side and the front side of the base.

* * * * *

UNITED STATES PATENT AND TRADEMARK OFFICE
CERTIFICATE OF CORRECTION

PATENT NO. : 6,115,249
DATED : September 5, 2000
INVENTOR(S) : Thomas M. CIPOLLA and George L. CHIN It is certified that error appears in the above-identified patent and that said Letters Patent is hereby corrected as shown below:

Column 9, line 26, replace "that" with --than--.

Signed and Sealed this

Twenty-ninth Day of May, 2001

Attest:

NICHOLAS P. GODICI

*Attesting Officer*     *Acting Director of the United States Patent and Trademark Office*